(12) United States Patent
Neuman et al.

(10) Patent No.: US 10,168,463 B1
(45) Date of Patent: Jan. 1, 2019

(54) SOLID-STATE LIGHTING APPARATUS

(71) Applicant: AUTOMATED ASSEMBLY CORPORATION, Lakeville, MN (US)

(72) Inventors: David Neuman, Randolph, MN (US); Scott Lindblad, Lakeville, MN (US)

(73) Assignee: Automated Assembly Corporation, Lakeville, MN (US)

( * ) Notice: Subject to any disclaimer, the term of this patent is extended or adjusted under 35 U.S.C. 154(b) by 113 days.

(21) Appl. No.: 15/083,704

(22) Filed: Mar. 29, 2016

(51) Int. Cl.
*G02B 6/00* (2006.01)
*F21V 8/00* (2006.01)

(52) U.S. Cl.
CPC ............ *G02B 6/0041* (2013.01); *G02B 6/009* (2013.01); *G02B 6/0031* (2013.01); *G02B 6/0055* (2013.01); *G02B 6/0065* (2013.01)

(58) Field of Classification Search
CPC .... G02B 6/0041; G02B 6/0055; G02B 6/009; G02B 6/0013; G02B 6/0051; G02B 6/0065; G02F 1/133615
USPC ................................................ 362/623, 600
See application file for complete search history.

(56) References Cited

U.S. PATENT DOCUMENTS

| | | | |
|---|---|---|---|
| 5,461,547 A * | 10/1995 | Ciupke | G02B 6/0038 349/64 |
| 7,070,301 B2 | 4/2006 | Margarill | |
| 7,537,374 B2 | 5/2009 | Schardt et al. | |
| 2013/0121023 A1* | 5/2013 | Kwon | G09F 13/14 362/607 |
| 2013/0201721 A1* | 8/2013 | Tsai | G02B 6/0036 362/609 |

* cited by examiner

*Primary Examiner* — Karabi Guharay
(74) *Attorney, Agent, or Firm* — Crawford Maunu PLLC

(57) ABSTRACT

The disclosure describes a lighting apparatus that includes a light-diffusive panel having opposing first and second faces and two or more side portions. A side portion has a curved surface and a third surface. Solid-state lighting (SSL) elements are disposed proximate the third surface of the side portion and are arranged to emit light at the third surface. A first reflector is disposed on the curved surface of the side portion and has a reflective surface to reflect light from the SSL elements into the light-diffusive panel. A plurality of disruptions are formed on the second face of the light-diffusive panel and are arranged to disperse internally reflected light. A second reflector is disposed on the second face of the light-diffusive panel and is arranged to reflect light emitted from the second surface into the light-diffusive panel.

23 Claims, 4 Drawing Sheets

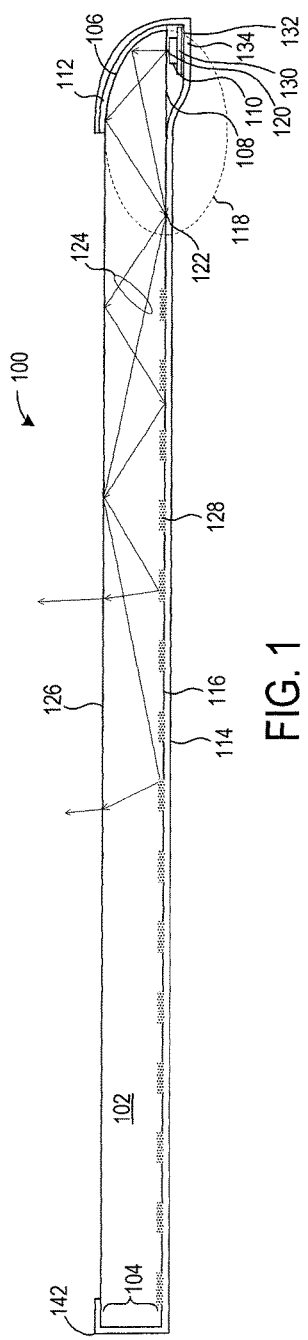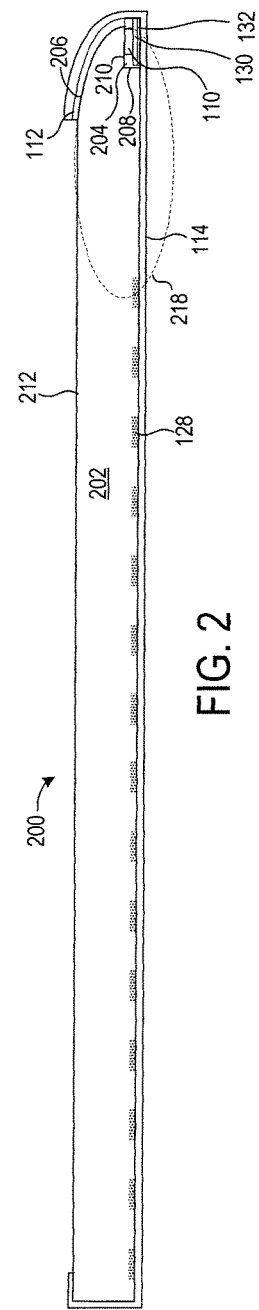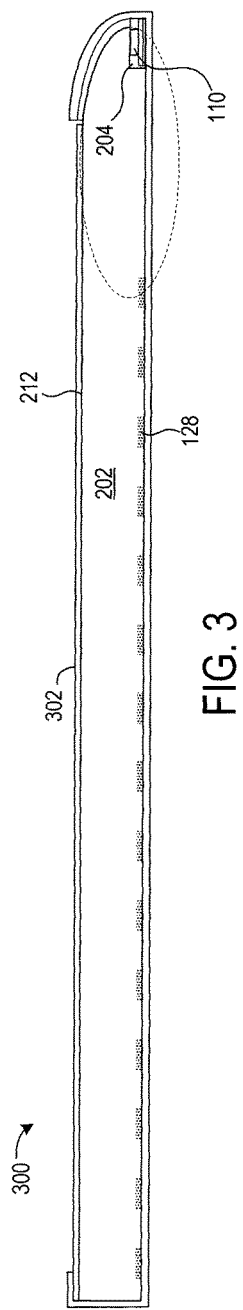

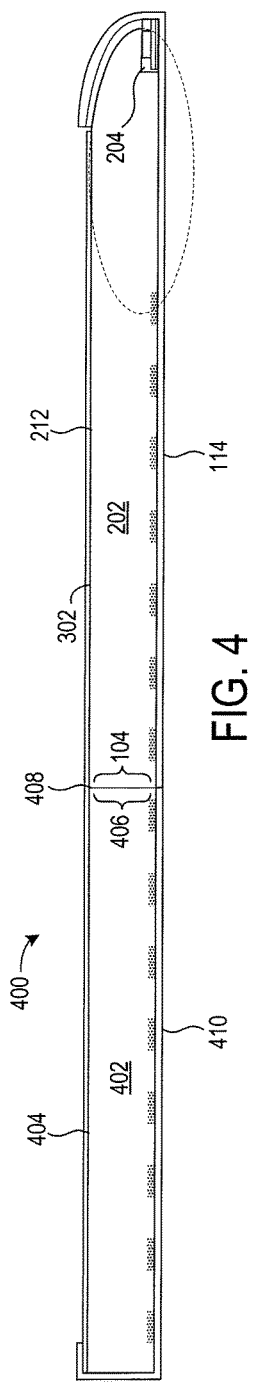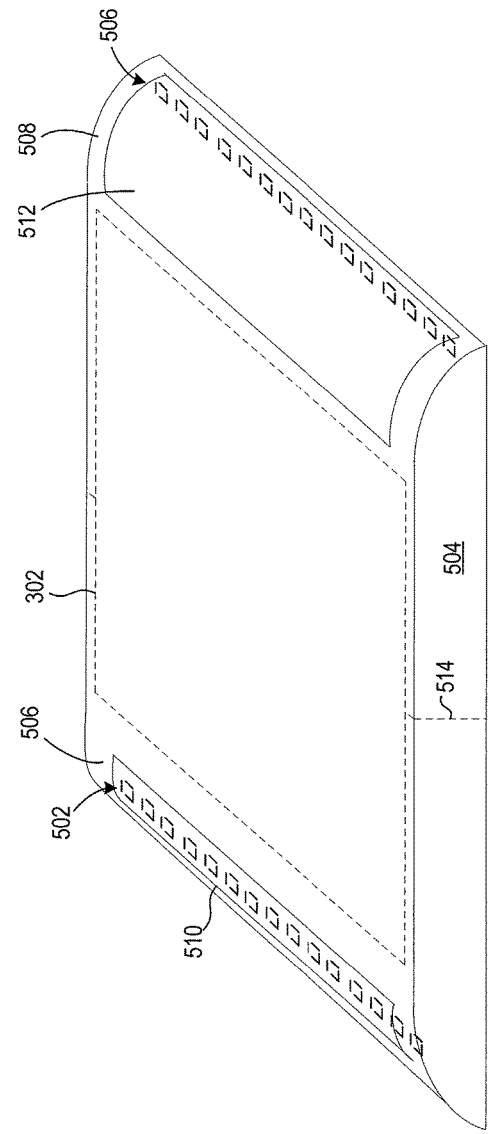

SOLID-STATE LIGHTING APPARATUS

FIELD OF THE INVENTION

The disclosed embodiments generally relate to a solid-state lighting apparatus.

BACKGROUND

Solid-state lighting (SSL) apparatus have semiconductor structures that emit light. Examples of SSL lighting include light-emitting diodes (LEDs), semiconductor laser diodes (LDs), organic light-emitting diodes (OLED), polymer light-emitting diodes (PLED), or quantum dots. Individual LEDs, LDs, OLEDs, PLEDs, and quantum dots may be referred to as "SSL elements." SSL is becoming more popular due in part to the energy efficient qualities and durability of SSL. One popular application is advertising and public information signage. In some implementations, LEDs are placed along one or more edges of a light-transmitting panel, and the light-transmitting panel is configured to evenly distribute light emitted from the LEDs through a surface of the panel.

With an edge-lit panel, light from the LEDs is spread evenly through the panel by total internal reflection. Disruptions formed on the surface of the panel scatter incident light so that light is emitted from the surface of the panel.

SUMMARY

In one implementation, a lighting apparatus includes a light-diffusive panel having opposing first and second faces and two or more side portions. At least one of the side portions has a curved surface and a third surface. A plurality of SSL elements are disposed proximate the third surface of the at least one side portion and are arranged to emit light at the third surface and into the at least one side portion. A first reflector is disposed on the curved surface of the at least one side portion. The first reflector has a reflective surface arranged to reflect light from the plurality of SSL elements into the light-diffusive panel. The light reflected from the first reflector is internally reflected in the light-diffusive panel. The second face of the light-diffusive panel has a plurality of disruptions, and the disruptions are arranged to disperse internally reflected light. A second reflector is disposed on the second face of the light-diffusive panel, and the second reflector is arranged to reflect light emitted from the second surface into the light-diffusive panel.

In another implementation, a lighting apparatus includes a first light-diffusive panel having opposing first and second faces and two or more side portions. A first side portion of the at least two side portions has a curved surface and a third surface. A plurality of SSL elements are disposed proximate the third surface of the first side portion and are arranged to emit light at the third surface and into the first side portion. A second light-diffusive panel has opposing fourth and fifth faces and two or more side portions. A second side portion of the two or more side portions of the first light-diffusive panel abuts a first side portion of the two or more side portions of the second light-diffusive panel. A first reflector is disposed on the curved surface of the first side portion and has a reflective surface arranged to reflect light from the plurality of SSL elements into the light-diffusive panel. The light reflected from the first reflector is internally reflected in the light-diffusive panel. The second face of the first light-diffusive panel and the fifth face of the light-diffusive panel have a plurality of disruptions, and the disruptions are arranged to disperse internally reflected light. A second reflector is disposed on the second face of the first light-diffusive panel and on the fifth face of the second light-diffusive panel and arranged to reflect light emitted from the second surface into the first and second light-diffusive panels.

A method of making a lighting apparatus is also disclosed. The method includes forming a curved surface on a first side portion of a light-diffusive panel. The light-diffusive panel has opposing first and second faces and portions bounded by the first side portion. The method entails forming disruptions on the first face of the light-diffusive panel and positioning a plurality of SSL elements proximate a third surface of the first side portion and directed to emit light at the third surface and into the first side portion. A first reflector is disposed on the curved surface of the first side portion, and a reflective surface of the first reflector is arranged to reflect light from the plurality of SSL elements into the light-diffusive panel, such that the light reflected from the first reflector is internally reflected in the light-diffusive panel. The method further includes disposing a second reflector on the second face of the light-diffusive panel such that light emitted from the second surface is reflected into the light-diffusive panel.

The above summary is not intended to describe each disclosed embodiment. The figures and detailed description that follow provide additional example embodiments and aspects.

BRIEF DESCRIPTION OF THE DRAWINGS

Other aspects and advantages will become apparent upon review of the Detailed Description and upon reference to the drawings in which:

FIG. 1 shows a side view of an edge-lit SSL-based lighting apparatus having a curved, side portion and SSL elements disposed to emit light into a light-transmitting panel and orthogonal to a surface or face of the panel rather than positioned to emit light into an edge of the panel;

FIG. 2 shows a side view of an edge-lit SSL-based lighting apparatus having a notch in which the SSL elements may be disposed;

FIG. 3 shows a side view of an edge-lit SSL-based lighting apparatus having color-shifting material disposed on a surface of the panel;

FIG. 4 shows a side view of an edge-lit SSL-based lighting apparatus having multiple panels and color-shifting material disposed on surface of the panels;

FIG. 5 shows a perspective view of lighting apparatus having SSL elements disposed on multiple sides of a light-diffusive panel;

DETAILED DESCRIPTION

Figure 6:
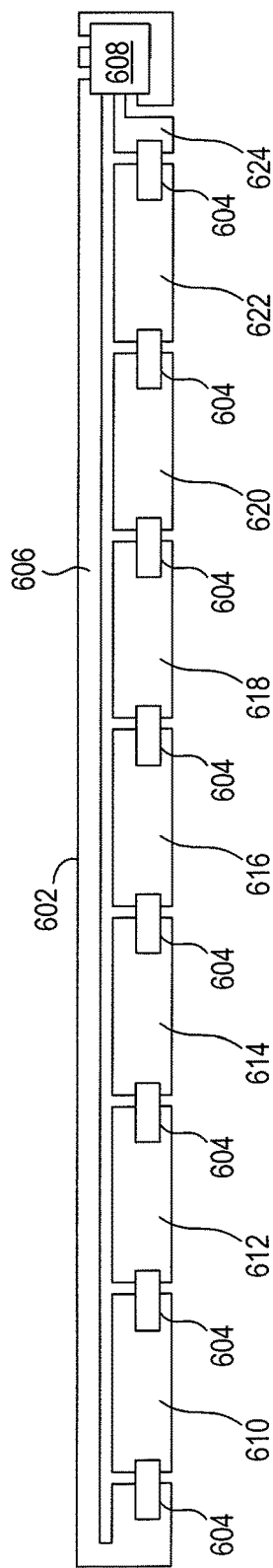
FIG. 6 illustrates SSL elements mounted on a metallic lead frame that provides both structural support and power.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

In applications involving large edge-lit LED panels, such as signage, durability, manufacturability, and cost are important factors for customers and manufacturers. SSL elements such as LEDs produce a large amount of heat in a small area, and inadequate heat dissipation may reduce the service life of the SSL elements. Thus, heatsinks are an important part of many SSL apparatuses. Providing a suitable heatsink may be challenging for a large edge-lit panel in view of the number and size of SSL elements required to adequately light the panel, along with form-factor constraints such as dimensions and weight.

In many edge-lit panels, light from the SSL elements is directed toward a side (commonly referred to as the "edge") that is orthogonal to two surfaces of a panel. The structure for supporting the SSL elements in the desired positional relationship to the panel and integrating a heatsink may complicate manufacture of the lighting apparatus and create form-factor and cost challenges.

This disclosure describes an SSL apparatus that eliminates complex structures that may be employed to hold SSL elements on an edge of a panel. The lighting apparatus provides convenient integration of a large heatsink that effectively dissipates heat from the SSL elements, thereby improving the service life.

In one implementation, a lighting apparatus includes a light-diffusive panel having opposing first and second faces and two or more side portions. At least one of the side portions has a curved surface and a third surface. A plurality of SSL elements are disposed proximate the third surface of the side portion and are arranged to emit light at the third surface and into the at least one side portion of the light-diffusive panel. A first reflector is disposed on the curved surface of the side portion and has a reflective surface. The first reflector reflects light emitted by the SSL elements into the light-diffusive panel, and the light reflected from the first reflector is internally reflected in the light-diffusive panel. The second face of the light-diffusive panel has a plurality of disruptions, and the disruptions are arranged to scatter internally reflected light. A second reflector is disposed on the second face of the light-diffusive panel and is arranged to reflect light emitted from the second surface into the light-diffusive panel.

All or a portion of the second reflector may also serve as a heatsink for the SSL elements. A least a portion of the second reflector may be sheet metal, such as an aluminum sheet, and the metal portion of the second reflector may be disposed proximate the SSL elements. Heat generated by the SSL elements is dissipated by the large surface area of the metal portion of the reflector.

Though some transmission loss may be incurred in directing light from the SSL elements toward a surface near the edge rather than at the edge of the panel, implementations may compensate for the loss by using SSL elements that are not coated with a phosphorous layer. A phosphorous coating on an SSL element may introduce optical scattering and light trapping within the coating. Also, as LED power increases, significant thermal and optical loads may be placed on the phosphor, which may lead to further drops in efficiency and performance at higher temperatures and power densities. Uncoated SSL elements experience less light loss, though the color of light may not be the desired color.

Instead of using a phosphorous coating over the SSL elements, color-shifting material may be disposed over the surface of the panel from which light is emitted. The color-shifting material shifts the emitted light to the desired color. In an implementation in which the color shifting material is a color shifting sheet, an added advantage is that the sheet may cover the seam(s) between panels in a multi-panel structure and effectively spread the light and illuminate any darker areas or dampen any brighter areas that might otherwise appear along the seam. The color-shifting material may be a separate sheet or a layer of phosphorous or organic dye applied to the surface of the panel such as by spraying curable liquid.

FIG. 1 shows a side view of an edge-lit SSL-based lighting apparatus having a curved, side portion and SSL elements disposed to emit light into a light-transmitting panel and orthogonal to a surface or face of the panel rather than positioned to emit light into an edge of the panel. The lighting apparatus 100 includes a panel 102 having a first side portion 104 and another side portion that includes a curved surface 106 and a flat or nearly flat surface 108. SSL elements, such as SSL element 110, are disposed near the flat surface and positioned to emit light at the flat surface and into the panel 102.

A reflector 112 is disposed on the curved surface and has a reflective surface that reflects light incident from within the side portion of the panel into the panel 102. Reflector 112 includes a highly reflective surface that faces the panel 102. Greater reflectivity reduces loss of light energy in reflecting light back into the panel. In one implementation, reflector 112 may be a highly reflective paint applied by spraying or dipping. Deposition of reflective material on surface 108 may be avoided by masking, or deposited reflective material be removed mechanically or chemically.

Light reflected by reflector 112 is internally reflected within the panel. A second reflector 114 is disposed on the surface 116 of the panel and reflects light emitted from the panel back into the panel. In order to maintain internal reflection and evenly distribute light throughout the panel 102, a small gap (not shown) is present between the reflector 114 and the surface 116. A rough texture on the reflective surface of the reflector may provide a sufficient gap. The reflector 114 may be a diffusive reflector to promote even dispersion of light from the panel.

The side portion having curved surface 106 and flat surface 108 may in some implementations have a cross-section that is a partial ellipse, and each SSL element may be placed at a focus of the ellipse. A curved surface having a cross-section that follows the contours of an ellipse has been found to effectively reflect light into the panel in structures in which the light source is disposed at a focus of the ellipse. An example of an ellipse is shown by dashed line 118, and the partial ellipse is bounded by the lines that represent curved surface 106 and flat surface 108. SSL element 110 is disposed proximate the surface 108 by placing the SSL element at or near the focus 120. Light emitted from the SSL element and passing through the focus 120 is reflected by reflector 112 into the panel and the reflected light converges at focus 122 and is internally reflected in the panel as shown by the directional lines, of which lines 124 are examples. As shown in FIG. 5, multiple SSL elements may be disposed proximate foci of partial ellipses at multiple cross-sections of the side portion having the curved surface. Though the ellipse-like shape of the cross-section of the side portion and placement of an SSL element at the focus may be beneficial for efficiently reflecting light into the panel, it will be recognized that benefits may be attained from a curved surface that does not conform to a perfect ellipse, though with reduced efficiency.

In some implementations, the surface 108 of the side portion abuts the surface 116 of the panel. The side portion having the curved surface 106 and flat surface 108 may be an integral part of the panel 102, and the curved surface 106 may be formed by milling an edge of the panel to produce the desired shape.

The light-diffusive panel 102 may be a transparent thermoplastic such as polymethyl methacrylate (PMMA or "acrylic glass") or other material suitable for application requirements. The panel may be any polygon or a shape bounded by one or more curved sides, such as a circle, ellipse, or an irregular shape. The panel 102 has multiple disruptions on the surface/face 116. An example of the disruptions is disruption 128. With an edge-lit lighting apparatus, light from the SSL elements is spread evenly through the light-diffusive panel by total internal reflection. The disruptions formed on the surface of the panel scatter incident light so that light may be emitted from the opposing face of the panel. Another implementation may have disruptions formed on both surface 116 and the opposing surface 126.

SSL element 110 may be a bare (not packaged) SSL element or a packaged SSL element. Additionally, the SSL element may have a phosphorous coating or be uncoated as explained above. In one implementation, the SSL element is attached to a lead frame 130. The lead frame may be a stamped copper lead frame 130 that provides supporting structure and power and optionally control. A stamped copper lead frame promotes heat dissipation as well as providing a thin structure desirable for thin form factors. The lead frame may be a flexible or rigid printed circuit board in other implementations, if form factor requirements permit. A dielectric layer 132 separates the lead frame from the heatsink 134. The lead frame 130 may be attached to the heatsink 134 by a thermally conductive adhesive.

In an implementation in which the reflector 114 is a metal sheet, such as aluminum, the heatsink 134 may be an integral part of the reflector 114. The surface of the metal sheet that faces the panel 102 may have a reflective coating, except for the area on which the lead frame is mounted, which may be bare metal. In an alternative implementation, the heatsink and the reflector may be separate elements (not shown). In one implementation, the reflector 114 may be attached to the panel 102 by portions that wrap around the sides of the panel 102. For example, reflector 114 includes a portion 142 that bends around side portion 104 and covers a small portion of surface 126 of the panel 102. In other implementations, a separate frame (not shown) may hold both the reflector 114 and the panel 102.

FIG. 2 shows a side view of an edge-lit SSL-based lighting apparatus having a notch in which the SSL elements may be disposed. The lighting apparatus 200 of FIG. 2 is similar to the lighting apparatus of FIG. 1, and the elements of FIG. 2 are generally as described above for FIG. 1. Lighting apparatus 200 differs from lighting apparatus 100 in that panel 202 has a notch 204, and the SSL element 110 is disposed within the notch. The lead frame 130 and dielectric layer may also be disposed within the notch or extend outside the notch. With the added notch, the curvature of the curved surface may change in order to effectively reflect light into the panel. For example, in FIG. 1 the curved surface having an elliptical cross-section conforms to the ellipse shown by dashed line 118, and in FIG. 2, the curved surface conforms to the ellipse shown by dashed line 218. The ellipse 218 is greater in the x dimension and lesser in the y dimension than the ellipse 118.

A side portion of the panel 202 includes curved surface 206 and surfaces 208 and 210 of the notch 204. The SSL element 210 is positioned within the notch to emit light at surface 210 and into the side portion toward the curved surface 206. Reflector 112 reflects light from the SSL element, and the light is internally reflected in the panel 202, scattered by disruptions (e.g., 128), reflected by reflector 114, and emitted from surface 212.

In an alternative implementation, instead of a notch defined by surfaces 208 and 210, the side portion may have a curved, concave surface (not shown), and the SSL element may be positioned within the concave area.

FIG. 3 shows a side view of an edge-lit SSL-based lighting apparatus 300 having a color-shifting material 302 disposed on a surface 212 of the panel 202. The lighting apparatus 300 of FIG. 3 is similar to the lighting apparatus of FIG. 2, and the elements of FIG. 3 are generally as described above for FIGS. 1 and 2. Instead of using a phosphorous coating over SSL element 110 to achieve the desired color of light, a color-shifting material 302 may be disposed over the surface 212 from which light is emitted. Light from the SSL element may be blue, and the color-shifting material shifts the emitted light to the desired color. The color-shifting material may be a separate sheet or a coating applied to the surface 212. Additionally, the color-shifting material may be phosphorous-based or comprise organic dye. Lighting apparatus 300, panel 102 of FIG. 1 may be used instead of panel 202 having notch 204.

FIG. 4 shows a side view of an edge-lit SSL-based lighting apparatus 400 having multiple panels 202 and 402 and color-shifting material 302 disposed on surface 212 of panel 202 and on surface 404 of panel 402. The lighting apparatus 400 of FIG. 4 is similar to the lighting apparatus of FIGS. 2 and 3, and the elements of FIG. 4 are generally as described above for FIGS. 1, 2, and 3.

Lighting apparatus 400 shows a structure in which multiple panels may be abutted and covered with a color-shifting sheet(s) that covers the seam(s) between panels. The color-shifting sheet(s) may be constructed with phosphorous or an organic die. Each of panels 202 and 402 has at least two side portions, and side portion 104 of panel 202 abuts side portion 406 of panel 402, forming seam 408.

Panel 402 abuts panel 202 at seam 408. Without the color-shifting sheet covering a seam, the area of the seam may be less or more illuminated than areas away from the seam. The color-shifting sheet may cover the seams between multi-panel structures and effectively spread the light, illuminating any darker areas or damping any brighter areas that might otherwise appear along the seam.

Lighting apparatus 400 may have multiple reflectors 114 and 410 as shown or may have a unitary reflector as shown in FIGS. 1, 2, and 3. In an alternative implementation of lighting apparatus 400, panel 102 of FIG. 1 may be used instead of panel 202 having notch 204.

FIG. 5 shows a perspective view of lighting apparatus 500 having SSL elements disposed on multiple sides of a light-diffusive panel. SSL elements 502 are disposed on one side of panel 504, and SSL elements 506 are disposed on another side of panel 504. The structures by which the SSL elements are disposed and attached to side portions of the panel 504 may be similar to the structures shown in FIG. 1 or 2. For example, one side portion includes curved surface 506, and another side portion includes curved surface 508. Reflectors 510 and 512 may be disposed on the curved surfaces 506 and 508, respectively.

The SSL elements 502 and 506 may be coated with phosphorous or uncoated. For uncoated SSL elements, the lighting apparatus may include color-shifting material 302. In another implementation, lighting apparatus 500 may include multiple light-diffusive panels, with one panel to the left of dashed line 514 and another panel to the right of dashed line 514. Each panel may be structured similar to either of panels 102 or 202 as shown in FIGS. 1 and 2.

FIG. 6 illustrates SSL elements mounted on a metallic lead frame that provides both structural support and power. The lead frame 602 may be stamped copper in one implementation, and the SSL elements 604 may be serially connected and joined to the lead frame by spot weld or solder joints, for example. Metal portion 606 connects a control circuit 608 to a first one of the serially connected SSL elements, and metal portions 610, 612, 614, 616, 618, 620, and 622 serially connect the SSL elements. A last one of the SSL elements in the series is connected to the control circuit by metal portion 624. The control circuit 608 may regulate current to the SSL elements and control other lighting effects.

In another implementation, the reflector 114 (FIGS. 1-4) may also distribute power to the LEDs as shown in co-pending patent application Ser. No. 14/575,648, entitled, *LED Lighting Apparatus*, filed on Dec. 18, 2014 by Lindblad et al., and assigned to the assignee of the present invention. The entire contents of patent application Ser. No. 14/575,648 are incorporated herein by reference.

Figure 7:
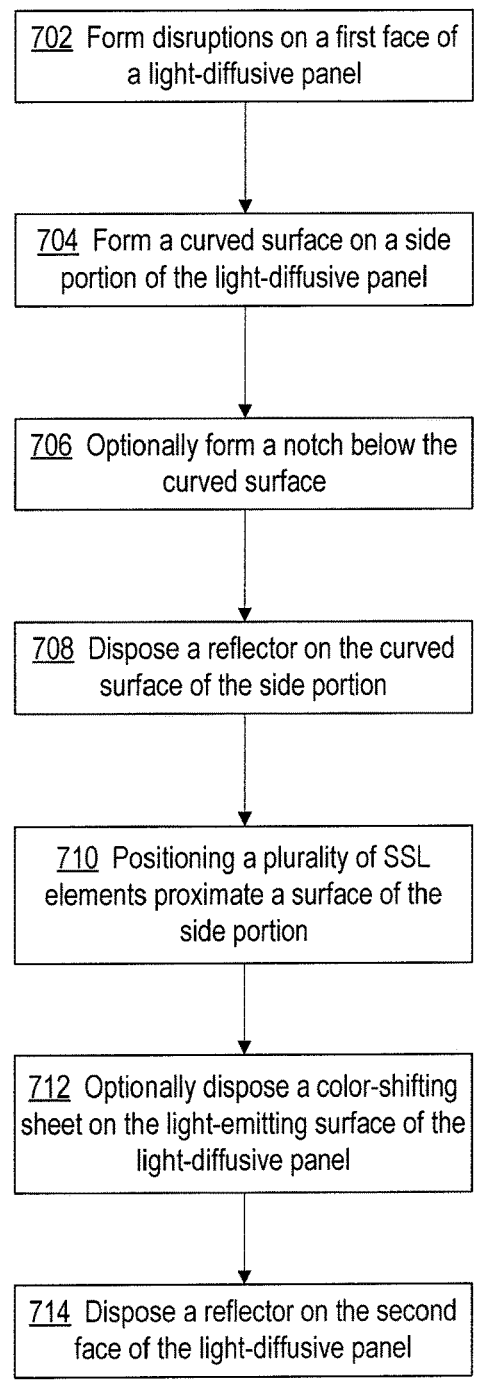
FIG. 7 shows a flowchart of a process of making an edge-lit lighting apparatus.

FIG. 7 shows a flowchart of a process of making an edge-lit lighting apparatus. At block 702, disruptions are formed in a light-diffusive panel. The disruptions may be formed by laser etching a pattern of dots on one of the faces of the light diffusive panel, for example.

At block 704, a curved surface is formed on at least one of the sides of the light-diffusive panel. The curved surface may effectively form one or more of the sides of the panel. That is, the curved surface may meet one surface of the panel and extend and merge with the opposing surface of the panel, as illustrated in FIG. 1. In one implementation, the curved surface may be formed by milling the side and edge to the desired shape and polishing the curved surface to provide a lustrous surface that complements a highly reflective mirror adhered to the curved surface. In another implementation, the curved-surface side portion of the light-diffusive panel may be a separate piece molded to the desired shape. The molded piece may be attached to the side of a panel by an adhesive that when cured is clear and does not discolor the bonded surfaces.

At block 706, a notch may be optionally formed below the curved surface. The notch may be formed by milling material from the side portion having the curved edge and polishing the portion of the notch at which the light from the SSL element will be directed. In an implementation in which the side portion having the curved surface is formed within a mold, the notch may be formed by the mold. The notch in a mold-formed side portion may be polished, depending on the quality of the mold.

At block 708 a reflector is disposed on the curved surface of the side portion such that light exiting the panel at the curved portion is reflected back into the panel. In one implementation, the reflector on the curved surface may be made by applying a coat of reflective paint to the curved surface, such as by spraying or dipping. Reflective material on the part of the side portion at which the SSL elements are to be disposed may be avoided by masking. Alternatively, reflective material present at the part of the side portion at which the SSL elements are to be disposed may be removed mechanically or chemically.

At block 710, SSL elements are positioned at a side portion of the light-diffusive panel to direct light into the panel and at the curved surface, such that light enters the panel and strikes the curved surface from within the panel. The SSL elements may be mounted on a lead frame. For a panel having a notch, the SSL elements may be disposed within the notch.

At block 712, a color-shifting material is attached to the surface of the light-diffusive panel from which light is to be emitted. As indicated above, the color-shifting material may be a sheet comprising phosphorous or organic dye, or a curable liquid coating of phosphorous or organic dye may be applied to the surface.

At block 714, another reflector is disposed on the surface of the light-diffusive panel opposite the surface from which light is to be emitted. In one implementation, the reflector may be a metal sheet, and the lead frame having the SSL elements may be attached to the reflector by a thermally conductive adhesive. In one implementation, the reflector may be attached to the light-diffusive panel by bending end portions of the reflector around sides of the panel such that the end portions engage the sides and hold the panel. In another implementation, a separate frame may hold the reflector proximate the surface of the panel.

Though aspects and features may in some cases be described in individual figures, it will be appreciated that features from one figure can be combined with features of another figure even though the combination is not explicitly shown or explicitly described as a combination.

The present invention is thought to be applicable to a variety of lighting applications. Other aspects and embodiments will be apparent to those skilled in the art from consideration of the specification and practice disclosed herein. It is intended that the disclosed apparatus and method be considered as examples only, with a true scope of the invention being indicated by the following claims.

What is claimed is:

1. A lighting apparatus, comprising:
a solid light-diffusive panel having opposing first and second faces and two or more side portions, wherein at least one of the side portions has a curved surface and a third surface, wherein the third surface is parallel to the first and second faces;
a plurality of SSL elements disposed proximate the third surface of the at least one side portion and arranged to emit light orthogonal to the third surface and into the at least one side portion;
a first reflector disposed on the curved surface of the at least one side portion and having a reflective surface arranged to reflect light from the plurality of SSL elements into the solid light-diffusive panel, wherein the light reflected from the first reflector is internally reflected in the solid light-diffusive panel;
a plurality of disruptions formed on the second face of the solid light-diffusive panel and arranged to disperse internally reflected light; and
a second reflector disposed on the second face of the solid light-diffusive panel and arranged to reflect light emitted from the second face into the solid light-diffusive panel,
wherein a cross-section of the at least one side portion is a partial ellipse, and the plurality of SSL elements are disposed at foci of partial ellipses at a plurality of cross-sections of the at least one side portion.

2. The lighting apparatus of claim 1, wherein the third surface abuts the second face.

3. The lighting apparatus of claim 1, wherein the third surface is a surface of a notch in the at least one side portion.

4. The lighting apparatus of claim 1, wherein the plurality of SSL elements are bare SSL elements.

5. The lighting apparatus of claim 4, further comprising a color-shifting sheet disposed on the first face.

6. The lighting apparatus of claim 4, further comprising a color-shifting material disposed on the first face.

7. The lighting apparatus of claim 1, wherein the plurality of SSL elements are packaged SSL elements having a phosphorous coating.

8. The lighting apparatus of claim 1, wherein at least two of the side portions have respective curved surfaces and respective third surfaces, and the lighting apparatus further comprising:
 another plurality of SSL elements disposed proximate the respective third surface of a second side portion of the at least two side portions and arranged to emit light at the respective third surface and into the second side portion; and
 a third reflector disposed on the respective curved surface of the second side portion and having a reflective surface arranged to reflect light from the other plurality of SSL elements into the solid light-diffusive panel, wherein the light reflected from the third reflector is internally reflected in the solid light-diffusive panel.

9. The lighting apparatus of claim 1, further comprising a copper lead frame, wherein the plurality of SSL elements are disposed on and electrically connected to the copper lead frame.

10. The lighting apparatus of claim 9, further comprising a dielectric layer attached to the copper lead frame.

11. The lighting apparatus of claim 10, wherein the second reflector includes a metal sheet, and the dielectric layer is disposed on a portion of the metal sheet.

12. A lighting apparatus, comprising:
 a first solid light-diffusive panel having opposing first and second faces and two or more side portions, wherein:
  a first side portion of the two or more side portions has a curved surface and a third surface, and
  the third surface is parallel to the first and second faces;
 a plurality of SSL elements disposed proximate the third surface of the first side portion and arranged to emit light orthogonal the third surface and into the first side portion;
 a second solid light-diffusive panel having opposing fourth and fifth faces and two or more side portions, wherein a second side portion of the two or more side portions of the first solid light-diffusive panel abuts a first side portion of the two or more side portions of the second solid light-diffusive panel;
 a first reflector disposed on the curved surface of the first side portion and having a reflective surface arranged to reflect light from the plurality of SSL elements into the first solid light-diffusive panel, wherein the light reflected from the first reflector is internally reflected in the first and second solid light-diffusive panels;
 a plurality of disruptions formed on the second face of the first solid light-diffusive panel and on the fifth face of the second solid light-diffusive panel and arranged to disperse internally reflected light; and
 a second reflector disposed on the second face of the first solid light-diffusive panel and on the fifth face of the second solid light-diffusive panel and arranged to reflect light emitted from the second face into the first and second solid light-diffusive panels,
 wherein a cross-section of the first side portion is a partial ellipse, and the plurality of SSL elements are disposed at foci of partial ellipses at a plurality of cross-sections of the first side portion.

13. The lighting apparatus of claim 12, wherein the third surface abuts the second face.

14. The lighting apparatus of claim 12, wherein the third surface is a surface of a notch in the first side portion.

15. The lighting apparatus of claim 12, wherein the plurality of SSL elements are bare SSL elements.

16. The lighting apparatus of claim 15, further comprising a color-shifting sheet disposed on the first face of the first solid light-diffusive panel, on the fourth face of the second solid light-diffusive panel, and over a seam at which the second side portion of the two or more side portions of the first solid light-diffusive panel abuts the first side portion of the two or more side portions of the second solid light-diffusive panel.

17. The lighting apparatus of claim 12, wherein the plurality of SSL elements are packaged SSL elements having a phosphorous coating.

18. The lighting apparatus of claim 12, wherein a third side portion of the two or more side portions of the second solid light-diffusive panel has a curved surface and a sixth surface, and the lighting apparatus further comprising:
 another plurality of SSL elements disposed proximate the sixth surface of the third side and arranged to emit light at the sixth surface and into the third side portion; and
 a third reflector disposed on the curved surface of the third side portion and having a reflective surface arranged to reflect light from the other plurality of SSL elements into the second solid light-diffusive panel, wherein the light reflected from the third reflector is internally reflected in the second solid light-diffusive panel.

19. The lighting apparatus of claim 12, further comprising a copper lead frame, wherein the plurality of SSL elements are disposed on and electrically connected to the copper lead frame.

20. The lighting apparatus of claim 19, further comprising a dielectric layer attached to the copper lead frame.

21. The lighting apparatus of claim 20, wherein the second reflector includes a metal sheet, and the dielectric layer is disposed on a portion of the metal sheet.

22. A method of making a lighting apparatus, comprising:
 forming a curved surface on a first side portion of a solid light-diffusive panel, the solid light-diffusive panel having opposing first and second faces having portions bounded by the first side portion, wherein a cross-section of the first side portion is a partial ellipse;
 forming disruptions on the first face of the solid light-diffusive panel;
 positioning a plurality of SSL elements proximate a third surface of the first side portion and directed to emit light orthogonal to the third surface and into the first side portion, wherein the third surface is parallel to the first and second faces;
 disposing the plurality of SSL elements at foci of partial ellipses at a plurality of cross-sections of the first side portion;
 disposing a first reflector on the curved surface of the first side portion, and arranging a reflective surface of the first reflector to reflect light from the plurality of SSL elements into the solid light-diffusive panel, such that the light reflected from the first reflector is internally reflected in the solid light-diffusive panel; and disposing a second reflector on the second face of the solid light-diffusive panel such that light emitted from the second face is reflected into the solid light-diffusive panel.

23. The method of claim 22, wherein the disposing the second reflector on the second face of the solid light-diffusive panel includes disposing an aluminum sheet on the second face of the solid light-diffusive panel.

* * * * *